(12) United States Patent  
Shelton

(10) Patent No.: US 6,449,913 B1
(45) Date of Patent: Sep. 17, 2002

(54) PARQUET FLOORING PANEL COMPRISING SPACED, WOODEN STRIPS SECURED BY ADHESIVE AND FORMING IRREGULAR END SHAPES FOR ALIGNMENT WITH ADJACENT PANELS

(76) Inventor: Floyd Shelton, 901 E. Thomas St., Wausau, WI (US) 54403

( * ) Notice: Subject to any disclaimer, the term of this patent is extended or adjusted under 35 U.S.C. 154(b) by 0 days.

(21) Appl. No.: 09/500,053

(22) Filed: Feb. 8, 2000

(51) Int. Cl.[7] .............................................. E04F 13/08
(52) U.S. Cl. ..................... 52/390; 52/403.1; 52/506.01; 52/746.12
(58) Field of Search .......................... 52/390, 393, 392, 52/388, 403, 480, 391, 403.1, 506.01, 746.12, 747.1, 748.11, 311.1, 313, 342, 343

(56) References Cited

U.S. PATENT DOCUMENTS

| 311,666 A | * | 2/1885 | Morrison, Jr. | 52/342 |
|---|---|---|---|---|
| 1,828,193 A | * | 10/1931 | Levin | 52/314 |
| 2,122,577 A | * | 7/1938 | Mattes et al. | 52/314 |
| 3,535,839 A | * | 10/1970 | Strubing | 428/50 |
| 3,619,964 A | * | 11/1971 | Passaro et al. | 52/314 |
| 3,717,247 A | * | 2/1973 | Moore | 206/59 |
| 4,090,338 A | | 5/1978 | Bourgade | 52/392 |
| 4,682,459 A | * | 7/1987 | Stephenson | 52/390 |
| 5,103,614 A | * | 4/1992 | Kawaguchi et al. | 52/392 |
| 5,229,401 A | | 4/1994 | Shelton | 52/393 |
| 5,299,401 A | * | 4/1994 | Shelton | 52/393 |
| 5,325,652 A | | 7/1994 | Feder | 52/746 |
| 5,755,068 A | * | 5/1998 | Ormiston | 52/314 |
| 5,900,099 A | * | 5/1999 | Sweet et al. | 156/278 |
| 5,987,839 A | * | 11/1999 | Hamar et al. | 52/582.1 |
| 6,119,423 A | * | 9/2000 | Costantino | 52/390 |
| 6,141,931 A | * | 11/2000 | Simmons | 52/480 |
| 6,156,402 A | * | 12/2000 | Smith | 428/40.1 |

* cited by examiner

Primary Examiner—Carl D. Friedman
Assistant Examiner—Naoko Slack
(74) Attorney, Agent, or Firm—Russell L. Johnson

(57) ABSTRACT

A parquet panel assembled of rectangular shaped wood strips as inlays and the panel is formed to have irregular end edges such that alternate rows of inlay strips are staggered in such a way that a staggered edge of one panel will interleave with the staggered edge of an adjacent panel with sufficient precision that the seams between panels are not detectable and a former which enables the positioning and joining of the inlay strips with the requisite precision needed to assemble the panel.

8 Claims, 3 Drawing Sheets

PARQUET FLOORING PANEL COMPRISING SPACED, WOODEN STRIPS SECURED BY ADHESIVE AND FORMING IRREGULAR END SHAPES FOR ALIGNMENT WITH ADJACENT PANELS

BACKGROUND OF THE INVENTION

1. Field of the Invention

This invention relates to parquet flooring. More particularly this invention relates to an assembly of wood inlays that form a parquet panel which can be interleaved with other similar panels to form a parquet floor. Still more particularly, this invention relates to the parquet panel described above wherein the panel is assembled with the wood inlays accurately spaced to accommodate to the expansion and contraction of the wood. Still more particularly this invention relates to the parquet panel described above wherein an athletic floor formed of the parquet panels supported by a DIN certifiable subfloor will provide a DIN certifiable athletic floor.

Wood expands and contracts with changes in temperature and humidity. To provide for the expansions and contractions of wood flooring, space is provided for the floor to expand and contract at the perimeter of the floor or between the components of the floor. In quality hardwood floors such as athletic floors, it is imperative that the flooring does not buckle under conditions of maximum expansion or develop large gaps between the elements during periods of severe contractions.

Parquet floors which are built up of many small strips of wood have many seams between the strips of wood and the range of expansion and contraction of each strip of wood is small. Consequently, it is possible to fit the elements of a parquet floor rather closely and still provide an adequate seam width to accommodate the expansion and contraction of the strips.

2. Description of Related Art

Traditionally, strip and parquet floors are laid one strip at a time using shims to set the spacing between the wood strips. In some instances panels made up of wood inlays and having regular geometric shapes, usually regular polygons, are formed on a backing and laid as tiles or modules. Heretofore, the art has not provided a parquet flooring panel that when interleaved with a multiplicity of such panels provides a parquet floor with the appearance and properties of individually laid strips and wherein the seams between panels is not discernible in the finished floor.

Heretofore, parquet athletic floors have not proven to be satisfactory. The parquet floor that the Boston professional basketball team played on for many years was notorious for dead spots and uneven surface qualities. Todays quality athletic floors are subjected to DIN tests and certified to meet DIN standards. The inventor's own patent, U.S. Pat. No. 5,299,401 to Shelton, which is incorporated herein by reference, teaches a DIN certifiable parquet athletic flooring system. The wood strips that provide the inlays that form the parquet flooring pattern are laid one at a time which is a time consuming and costly process.

The teachings of the Shelton patent serve to make clear the tests that are made to achieve DIN certification and will serve as an enabling disclosure of a DIN certifiable subfloor that is suitable as a subfloor for the laying of the panels of this disclosure to form a DIN certifiable parquet athletic floor.

U.S. Pat. No. 4,090,338 to Bourgade teaches a method of laying a parquet flooring wherein parquet elements that have "a right angled parallelepipedic periphery" are mounted on a toothed base such that the base of one element will interlock with the base of an adjacent element to form a floor of such adjacent elements.

U.S. Pat. No 5,325,652 to Feder teaches the steps of adhering strips of stone to flexible backing and attaching the backing over a curved surface and thereafter grouting the open seams.

While the above disclosed patents teach or suggest some of the concepts underlying the instant invention it can not be fairly said that the prior art teaches or suggests the parquet flooring panel of this invention, or the former employed to achieve the requisite precision needed for the employment of such a panel in a parquet athletic floor.

BRIEF SUMMARY OF THE INVENTION

A parquet flooring panel formed from a multiplicity of elongate wood inlays arranged in multiple staggered rows so that each inlay is spaced apart from adjacent inlays a preestablished distance and the ends of the panel are staggered at each row and the inlays are joined by tape facings to form a single parquet flooring panel such that each panel is alignable and interleaveable with an adjacent panel to form a continuous parquet flooring pattern wherein the margins of the panels are not discernible in a finished floor.

And, a process for forming the parquet flooring panel comprising: the steps of: a) positioning the wood inlays on the surface of a cylindrical former having indices for locating the inlays along the cylinder and around the cylinder so that the ends of the inlays are staggered for alternate rows and so that the long edges of the inlays lie along straight line elements of the former, b) applying at least one tape facing to the inlays so that the assembled inlays are joined together to form a panel. and c) removing the assembled panel from the former.

DETAILED DESCRIPTION OF THE INVENTION

Figure 1:
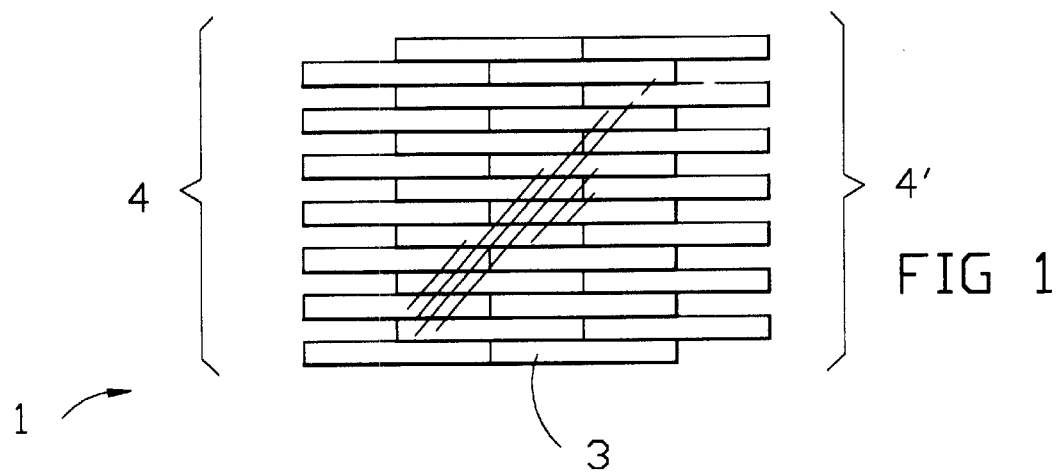
FIG. 1 is a plan view of a parquet flooring panel made according to this invention.

In the drawings, like numbers refer to like objects and the proportions of some elements have been changed to facilitate illustration.

The term "flexible backing material" as used herein shall be read to include flexible materials such as paper, cloth, plastic, mesh, cording and the like employed as backing or facing.

The term adhesive strip as used herein shall be read to include strands, bands, tapes, sheets and the like.

Figure 7:
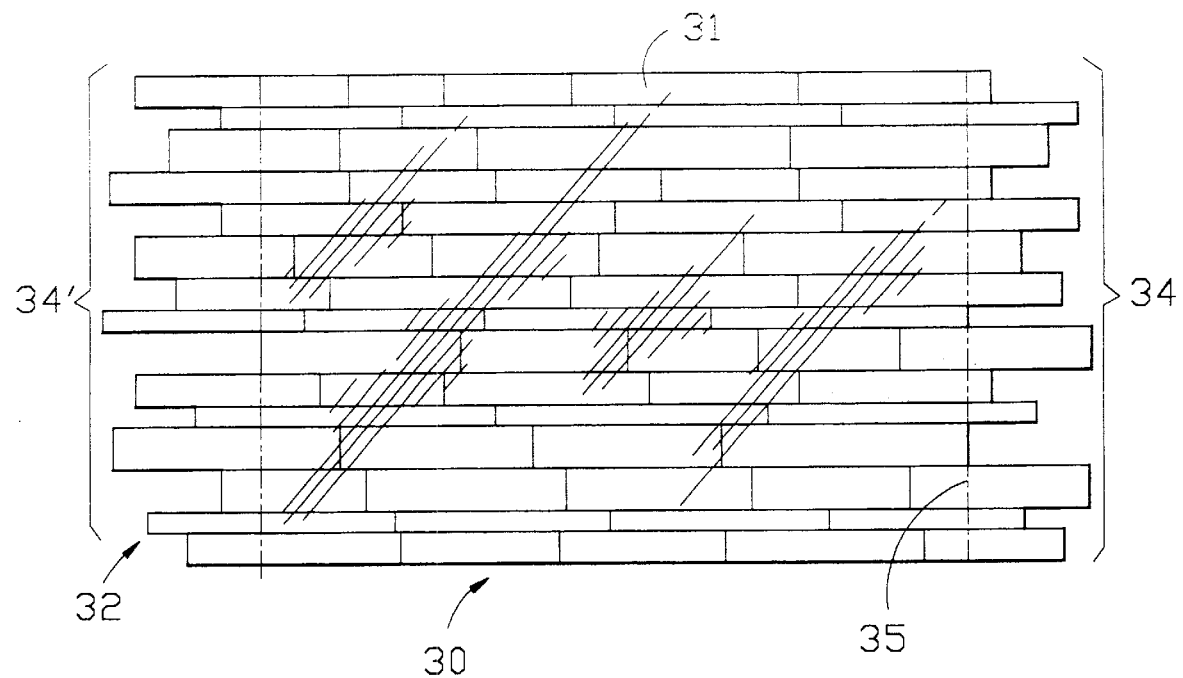
FIG. 7 is a plan view of a parquet flooring panel made according to this invention.
Figure 8:
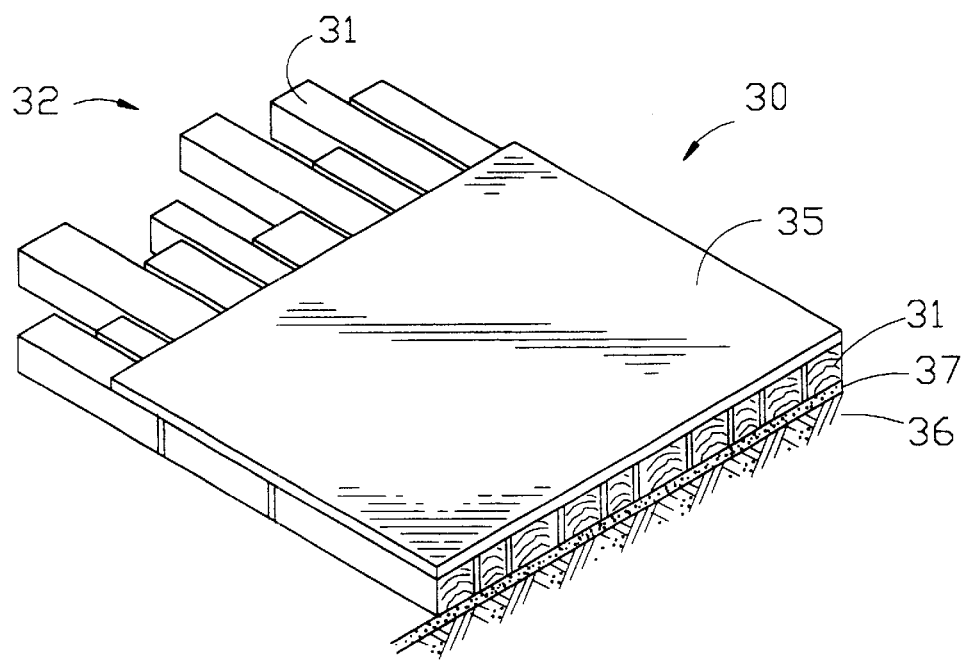
FIG. 8 is a sectioned perspective view of the parquet flooring panel of FIG. 7 in place in a flooring structure.

FIGS. 1 through 6 and the disclosure related thereto are intended to relate the invention in one of its simplest forms. FIGS. 7 and 8 and the disclosures related thereto are intended to relate variations that are within the scope of the invention.

Figure 2:
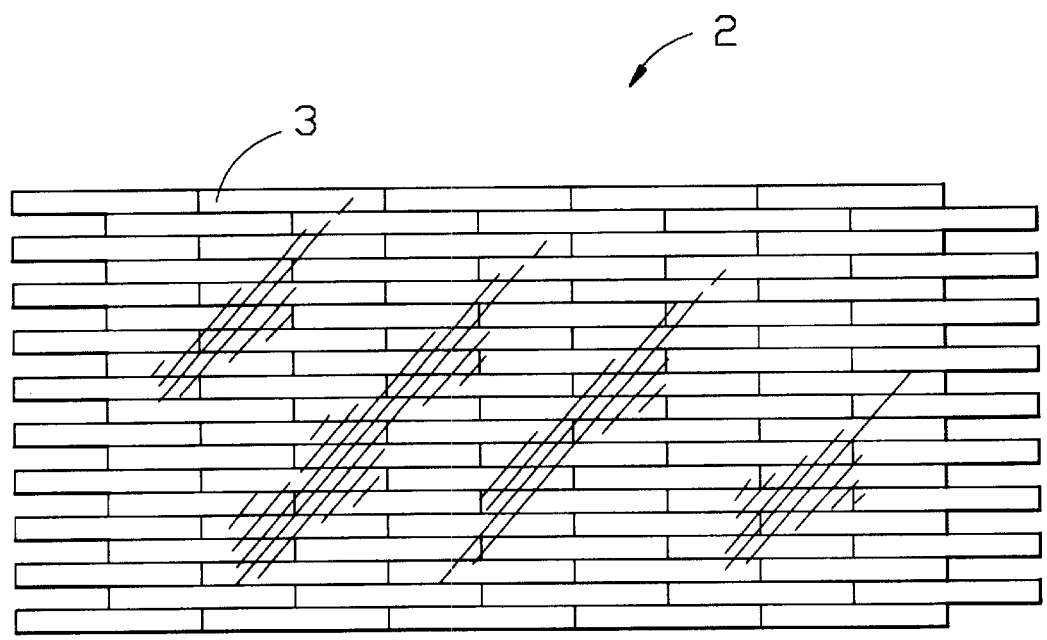
FIG. 2 is a plan view of a portion of a parquet floor made from an assemblage of a multiplicity of the panels of FIG. 1.

Referring now to FIGS. 1 and 2 wherein the novel interleaving of panels and the concealment of panel boundaries is illustrated. In FIG. 1 a plan view of a parquet flooring panel 1 of this invention is shown. In FIG. 2 a portion of a parquet floor 2 formed of a multiplicity of panels 1 is shown. FIG. 2 serves to illustrate that a parquet floor made according to this invention presents a continuous parquet pattern wherein the perimeters of individual panels is not detectable.

In strip laid conventional parquet floors, the strips typically are in the order of 0.75 inches thick, 2.25 inches wide, and at least 9 inches long. In the parquet panels of this invention, strips 3 are typically in the order of 0.25 inches thick, 1.0 inches wide, and 9.0 inches long. This results in a materials reduction of more than 50% in a finished floor.

Panels 1 are given an irregular end shape 4 by staggering the locations of the end seams in alternate rows. The irregular end shape 4 of an adjacent panel will align with and interleave with the irregular end shape 4' of a first panel to form a continuous parquet flooring pattern in which the seam between the panels is not detectable in the finished floor.

In the best mode of practicing the invention strips 3 are prepositioned on a flexible backing material such as cloth, mesh, or a sturdy paper backing and bonded in place on a support surface such as a concrete floor, or a wood subfloor.

Because strips 3 are of small size the range of expansion and contraction of strips 3 is small and therefore the spacing between strips 3 required for expansion and contraction is small. To accurately achieve the desired spacing and to insure that the irregular end shapes 4 and 4' of panel 1 are alignable and interleaveable the best mode of practicing the invention known to the inventor requires the use of a former in the shape of a segment of a cylinder having accurately located indexes for precisely locating and spacing each strip 3.

The first step in the process of assuring product uniformity comes in using wood sawed from the same location in forming parquet flooring strips 3.

The next step is to form all the strips to be used in a single lot of panels with the same machine settings and tooling for all the strips.

The next step is to assemble a panel from the strips wherein each strip is spaced apart from each adjacent strip a precisely set amount.

Heretofore, the precision placement of the individual inlay strips was time consuming and it was difficult to maintain uniformity of spacing throughout a flooring area.

Figure 3:
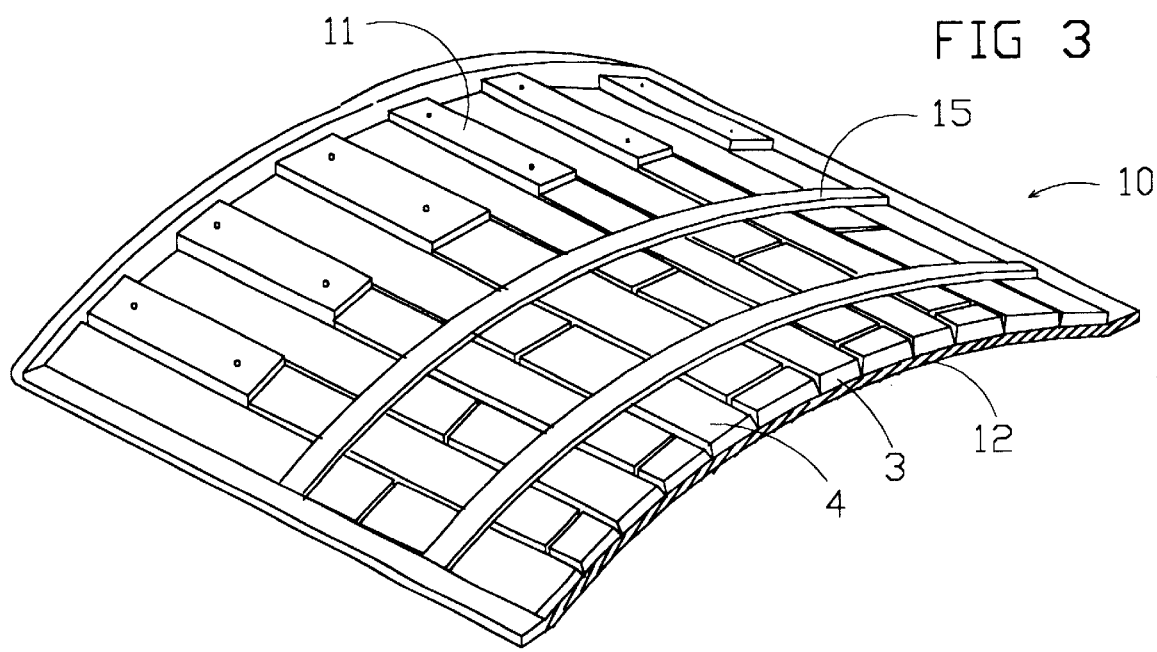
FIG. 3 is a sectioned perspective view of a former of this invention.
Figure 4:
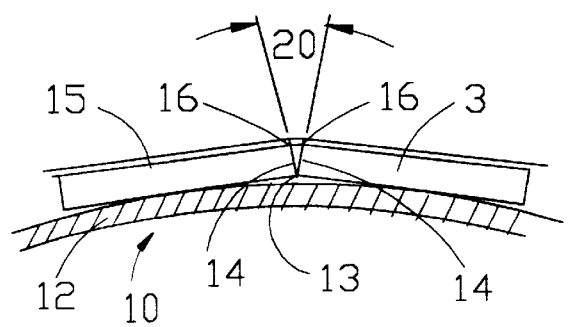
FIG. 4 is an elevational view of a portion of the former of FIG. 3
Figure 5:
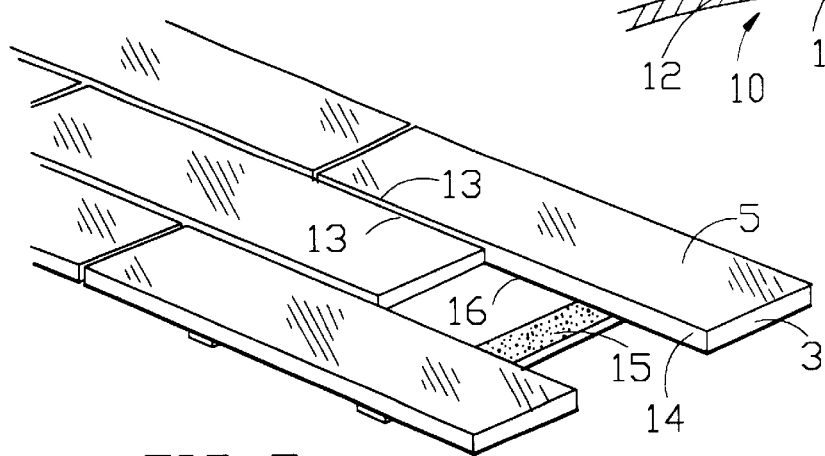
FIG. 5 is a fragmentary perspective view of a panel of this invention as it would appear in place on a floor.
Figure 6:
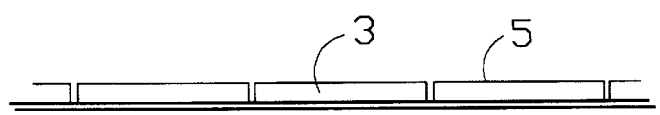
FIG. 6 is a fragmentary perspective view of the panel of FIG. 5.

A high degree of precision can be achieved in locating and spacing the parquet inlay strips of this invention through the use of the former 10 of FIGS. 3 and 4 to achieve the positioning illustrated in FIGS. 5 and 6.

As shown in FIGS. 3 and 4, strips 3 are positioned on former 10 in parallel rows so that indexes 11 precisely locate the rows of strips 3 so as to lie along the long axis of cylindrical shaped portion 12 of former 10 and to stager ends 4 and 4' so that an end 4 of one panel 1 is accurately interleaveable with a corresponding end 4' of a second panel 1.

It should be understood that strips 3 may be given a range of dimensions and remain within the scope of the invention. It should be further understood that the number of rows and the number of strips in a row may be varied for any given lot of panels 1.

As shown in FIGS. 3 and 4, the top longitudinal edge 13 of one strip 3 is in contact with the top longitudinal edge 13 of an adjacent strip 3 on former 10. The resulting angle 20 between the longitudinal sides 14 of strips 3 is uniform around the cylindrical portion 12 of former 10.

The next step is to attach flexible adhesive material such as tape strips 15 to the bottom surfaces 4 of strips 3 to join the multiple strips 3 into a single panel 1, It should be noted that adhesive strips 15 are representative of a range of flexible adhesive backings that are suitable for the forming of panel 1.

The next step is to remove panel 1 from former 10 and laying it flat with the bottom surfaces and the adhesive tape strips 15 down as shown in FIGS. 1,5 and 6. It should be noted that panel 1 can be laid on a flat surface with the adhesive strips 15 up.

At installation, panels 1 are bonded to a flooring substructure which is best shown in FIGS. 5 and 6 wherein strips 3 are bonded to the subfloor but are separated by a small but precise distance from adjacent strips 3. The degree of accuracy of the spacing of strips 3 is best illustrated by the following example:

EXAMPLE

Assume: strips 3 have the dimensions of 0.25 inches thick, 1.0 inches wide and 9.0 inches long.

Assume: the nominal spacing between strips 3 is to be 0.020 inches.

The angle 20 between strips 3 on former 10 would then be approximately 4.58 degrees and the radius of curvature of the cylindrical portion 12 of former 10 would be approximately 12.5 inches.

Assume: the range of variability of the thickness of panels 3 is plus or minus 1/64 (0.0156) inches.

Then the minimum gap between bottom longitudinal edges 16 of strips 3 would be 0.0188 inches. and the maximum 0.0212 inches. The range of variance in the spacing between bottom longitudinal edges 16 of strips 3 would be 0.0024 inches.

This level of precision and uniformity of spacing of parquet inlay strips for parquet flooring has not heretofore been obtainable.

The high degree of precision in spacing the strips 3 of panel 1 enables the close interleaving of edge 4 of one panel 1 with edge 4' of an adjacent panel 1 so that the seam between the two panels is not detectable in a finished floor.

To illustrate the degree of precision obtainable in laying and interleaving panels 1; if an error of one hundredth of an inch in placement is made in interleaving the panels 1 of the above example, the spacing between the top longitudinal edges 13 of interleaved strips 3 would be 0.03 inches to one side of interleaved strips 3 and 0.01 inches to the other side of interleaved strips 3. The proportional differences in such spacing would be detectable by eye and readily corrected.

It has been discovered that when floor 2 is laid upon a DIN certifiable subfloor, the resulting parquet athletic floor is DIN certifiable.

The above disclosures would enable one skilled in the art to employ the methods taught to achieve the panels of this invention without undue experimentation. However the scope of the invention can be better understood by reference to the following embodiments of the invention.

Referring now to FIGS. 7 and 8 wherein panel 30 will serve to illustrate variations of panel 1 of FIGS. 1–6 which are within the scope of this invention.

Wood inlay strips 31 are of differing lengths within rows 32 and the width of rows 32 differ from row to row. The stagger of ends 34 and 34' is interleavable Flexible backing material 35 in the form of a single band of adhesive tape joins all of the strips 31 as illustrated by the dashed line edges of material 35 in FIG. 7.

In FIG. 8, panel 30 is laid on subfloor 36 which is coated with adhesive material such as mastic 37. Panel 30 is laid with flexible backing material 35 up.

While the above disclosures are enabling and would permit one skilled in the art to make and use the invention for its intended purposes, it should be understood that the invention admits to a large number of embodiments that would be made readily obvious to one skilled in the art. To disclose, claim, and illustrate these embodiments would greatly multiply the drawings and cause the specifications and claims to become prolix. Therefore the scope of the invention should not be limited to the embodiments disclosed above. The scope of the invention should only be limited by the scope of the appended claims and all equivalents thereto that would become apparent to one skilled in the art.

What is claimed is:

1. A parquet flooring panel comprising:
   a) a multiplicity of elongate rectangular wood inlay strips positioned in parallel rows adjacent to each other and each wood inlay strip is spaced apart from adjacent wood inlay strips a pre-established distance,
   b) at least one flexible backing material adhesive strip joining the parallel rows to form an interconnected panel of wood inlays, and
   c) each panel having an irregular end shape that is allignable and interleaveable with an adjacent panel to form a continuous parquet flooring pattern wherein the margins of the panels are not discernible in a finished floor.

2. The parquet flooring panel of claim 1 wherein the wood inlays have a bottom side and a top side and the flexible backing material is applied to the bottom side of the inlays.

3. The parquet flooring panel of claim 1 wherein the wood inlays have a bottom side and a top side and the flexible backing material is applied to the top side of the inlays.

4. The Parquet flooring panel of claim 1 wherein the wood inlay strips are equal sized.

5. The parquet flooring panel of claim 1 in combination with a DIN certifiable subfloor to form a DIN certifiable parquet athletic floor.

6. A process for assembling the panel of claim 1 comprising: the steps of,
   a) positioning the wood inlays on the surface of a cylindrical former having indexes for locating the inlays along the cylinder and around the cylinder so that the ends of the inlays are staggered and so that the long edges of the inlays lie along straight line elements of the former,
   b) applying at least one band of adhesive flexible backing material to the inlays so that the assembled inlays are joined together to form a panel, and
   c) removing the assembled panel from the former.

7. The process of claim 6 wherein the inlays have a top side and a bottom side and the band of flexible backing material is applied to the top sides of the inlays.

8. The process of claim 6 wherein the inlays have a top side and a bottom side and the band of flexible backing material is applied to the bottom sides of the inlays.

* * * * *